(12) United States Patent
Swaine et al.

(10) Patent No.: US 7,080,289 B2
(45) Date of Patent: Jul. 18, 2006

(54) TRACING MULTIPLE DATA ACCESS INSTRUCTIONS

(75) Inventors: Andrew Brookfield Swaine, Welwyn Garden City (GB); David James Williamson, Austin, TX (US)

(73) Assignee: ARM Limited, Cambridge (GB)

( * ) Notice: Subject to any disclaimer, the term of this patent is extended or adjusted under 35 U.S.C. 154(b) by 966 days.

(21) Appl. No.: 09/973,189

(22) Filed: Oct. 10, 2001

(65) Prior Publication Data

US 2003/0154028 A1      Aug. 14, 2003

(51) Int. Cl.
    *G06F 11/00* (2006.01)
(52) U.S. Cl. .................. 714/45; 714/30; 712/227; 717/128
(58) Field of Classification Search .............. 714/45, 714/30; 717/128; 712/227
    See application file for complete search history.

(56) References Cited

U.S. PATENT DOCUMENTS

| | | | |
|---|---|---|---|
| 4,733,346 A * | 3/1988 | Tanaka | 712/228 |
| 5,222,219 A * | 6/1993 | Stumpf et al. | 710/105 |
| 5,752,013 A * | 5/1998 | Christensen et al. | 712/227 |
| 5,881,224 A * | 3/1999 | Ranson et al. | 714/47 |
| 5,917,771 A * | 6/1999 | Hill | 365/230.03 |
| 5,996,092 A * | 11/1999 | Augsburg et al. | 714/38 |
| 6,317,847 B1 * | 11/2001 | Haubursin et al. | 714/45 |
| 6,513,134 B1 * | 1/2003 | Augsburg et al. | 714/38 |
| 6,728,949 B1 * | 4/2004 | Bryant et al. | 717/127 |
| 6,738,885 B1 * | 5/2004 | Zhang et al. | 711/173 |
| 6,826,747 B1 * | 11/2004 | Augsburg et al. | 717/128 |

* cited by examiner

Primary Examiner—Robert Beausoleil
Assistant Examiner—Philip Guyton
(74) Attorney, Agent, or Firm—Nixon & Vanderhye P.C.

(57) ABSTRACT

A microprocessor integrated circuit 104 is provided with a trace controller 120 that is responsive to trace initiating conditions to trigger commencement of tracing operation and generation of a trace data stream. In the case of a multi-word data transfer instruction LSM, the trace controller 120 is able to trigger tracing partway through that instruction such that a subset of the transfer specified by that instruction are included within the trace data stream. All transfers subsequent to the triggering transfer may be traced with those transfers subsequent to the triggering transfer being marked with place holder codes rather than more informative full trace data for the triggering transfer.

12 Claims, 7 Drawing Sheets

| INST | HIT / MISS | DATA |
|---|---|---|
| 18 — LDR[Rm] | HIT | DATA[Rm] |
| MOV | N / A | — |
| CMP | N / A | — |
| ⋮ | ⋮ | ⋮ |
| 20 — LDR[Rm] | MISS | — |
| MOV | N / A | — |
| CMP | N / A | DATA[Rm] |
| ⋮ | ⋮ | ⋮ |
| 22 — LDR[R1] | MISS | — |
| 24 — LDR[R2] | MISS | — |
| MOV | N / A | — |
| CMP | N / A | 28 — DATA[R2] |
| ADD | N / A | 26 — DATA[R1] |

VARIABLE DELAY

MISSED DATA RETURNED OUT OF OTDER

| INSTRUCTION TRACE STREAM | DATA TRACE STREAM |
|---|---|
| ⋮ | ⋮ |
| 30 — LDR[R1] - - MISS | 32 — DATA PLACE HOLDER TAG 1 |
| MOV | — |
| CMP | — |
| 34 — LDR[R2] - - HIT | 36 — DATA[R2] |
| 38 — LDR[R3] - - MISS | 40 — DATA PLACE HOLDER TAG 2 |
| ADD | — |
| MOV | 42 — LATE DATA TAG 2[R3] |
| SUB | 44 — LATE DATA TAG 1[R1] |
| ⋮ | ⋮ |

FIG. 3

| INSTRUCTION TRACE STREAM | DATA TRACE STREAM |
|---|---|
| ⋮ | ⋮ |
| 46 — LDR[R1] - - MISS | 48 — DATA PLACE HOLDER 0 PENDING |
| CMP | — |
| ADD | — |
| LDR[R2] - - HIT | DATA[R2] |
| 50 — LDR[R3] - - MISS | 52 — DATA PLACE HOLDER 1 PENDING |
| SUB | 54 — LATE DATA[R1] |
| MOV | — |
| 56 — LDR[R4] - - MISS | 58 — DATA PLACE HOLDER 1 PENDING |
| CMP | LATE DATA[R3] |
| MOV | LATE DATA[R4] |
| ⋮ | ⋮ |

FIG. 4

| EXACT MATCH | ADD MATCH | DATA MATCH | TRACE ACTIVATION POINT |
|---|---|---|---|
| ✓ | ✓ | ✓ | ① |
| ✓ | ✓ | ✗ | NONE |
| ✗ | ✓ | ✓ | ② |
| ✗ | ✓ | ✗ | ② |

US 7,080,289 B2

TRACING MULTIPLE DATA ACCESS INSTRUCTIONS

BACKGROUND OF THE INVENTION

1. Field of the Invention

This invention relates to data processing systems. More particularly, this invention relates to data processing systems providing tracing mechanisms to enable data accesses via multiple data access instructions to be traced.

2. Description of the Prior Art

As data processing systems increase in complexity whilst it is desired to also reduce development time for new systems, there is a need to improve the debug and tracing tools and mechanisms that may be used within the development of data processing systems. Tracing the activity of a data processing system whereby a trace stream is generated including data representing the step-by-step activity in the system is a highly useful tool in system development. However, with the general increase in processing speeds, the speed at which trace data must be captured is also increased when it is desired to trace the real time operation of the system being developed. Accordingly, as well as off-chip tracing mechanisms for capturing and analysing trace data, increased amounts of tracing functionality are being placed on-chip. Examples of such on-chip tracing mechanisms are the Embedded Trace Macrocells provided by ARM Limited, Cambridge, England in association with their ARM7 and ARM9 processors.

It is known to provide tracing and debugging mechanisms incorporating trigger points that serve to control the debugging and tracing operation, such as starting or stopping debugging upon access to a particular register, address or data value. Such mechanisms are very useful for diagnosing specific parts of a system or types of behaviour. As an example, if a particular system bug is associated with exception behaviour, then tracing the full operation of the system would produce an inconveniently large volume of data when what was really required was tracing of the exception behaviour with this being triggered upon access to the appropriate exception handling vector.

SUMMARY OF THE INVENTION

Viewed from one aspect the present invention provides apparatus for processing data, said apparatus comprising:

(i) a register bank having a plurality of registers and operable to store data words to be processed;

(ii) processing logic operable in response to a multi-word data transfer instruction to transfer a plurality of data words between respective registers within said register bank and respective storage locations within a data memory; and (iii) tracing logic triggered by detection of a predetermined trace initiating condition to commence tracing operation generating a trace data stream of trace data part way through said multi-word data transfer instruction whereby a subset of transfers of said plurality of data words are traced within said trace data stream.

The invention recognises and solves a particular problem that can arise in providing triggered trace operation within a system that supports multi-word data transfer instructions. More particular, a multi-word data transfer instruction may result in a trace initiating condition at any point within its operation as a particular data transfer meets the trigger conditions. One way of dealing with this would be to trace all multi-word data transfer instructions irrespective of whether or not they met the trigger conditions or alternatively never to trace any mutli-word data transfer instruction even if it did meet the trigger conditions partway through its execution. The first option would result in a disadvantageous increase in the volume of trace data and the second would result in the possible loss of useful diagnostic information. The invention recognises the above situation and provides the solution of initiating tracing partway through the multi-word data transfer instruction and tracing a subset of the transfers concerned. The provision of the extra control logic necessary to provide this type of operation is more than outweighed by the advantages of being able to provide comprehensive trace coverage initiated from trace triggering conditions.

Whilst it would be possible to only trace the particular data transfer that met the triggering condition within the plurality of data transfers of the multi-word data transfer instruction, in practice considerable implementation complexity savings can be made when all the data transfers subsequent to the data transfer giving rise to the trigger are traced at least to some extent. This has the advantage that the complexity of determining which one of the data transfers within the multi-word data transfer instruction triggered the condition can be off-loaded to the system that analyses the trace data as the analysis system may count back from the end of the instruction to properly identify the trigger point. Skewing the complexity and overhead towards the trace analysis system is generally advantageous as it avoids unduly burdening the real life operational systems.

Whilst full trace data may be collected for data transfers subsequent to the triggering data transfer, preferred embodiments of the invention utilise place holder data for the subsequent transfers. The place holder data may be represented with fewer bits within the trace data stream preserving the bandwidth on the trace data stream for other uses.

As previously mentioned, the trace initiating condition could take various different forms. However, particularly preferred forms of trigger in the context of a multi-word data transfer instruction are ones triggered from the use of a predetermined register, a transfer using a predetermined memory address and a transfer of a predetermined data word value.

It will be appreciated that higher performance data processing systems may execute data transfers at least partially in parallel. For example, a system may be provided in which if two register loads may be performed in parallel on each processing cycle such that, for example, five registers may be loaded in three cycles with two registers loaded on each of the first two cycles and the remaining register loaded on the third cycle. In order to simply the trace data stream and accord with the programmers model of the behaviour of the system preferred embodiments generate the trace data to represent sequential transfers even if some transfers are performed in parallel. In particular, the multi-word data transfer instruction may specify a logical order in which transfers are to occur and the trace data will be written in this logical order even if some of the transfers occur in parallel.

Viewed from another aspect the present invention provides a method of processing data, said method comprising the steps of:

(i) storing data words to be processed within a register bank having a plurality of registers;

(ii) in response to a multi-word data transfer instruction, transferring a plurality of data words between respective registers within said register bank and respective storage locations within a data memory; and (iii) when triggered by detection of a predetermined trace initiating condition, commencing tracing operation generating a trace data stream of trace data part way through said multi-word data transfer instruction whereby a subset of transfers of said plurality of data words are traced within said trace data stream.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 3, 4 and 5 schematically illustrate three alternative systems for dealing with data access misses;

DESCRIPTION OF THE PREFERRED EMBODIMENTS

Figures 1, 2:
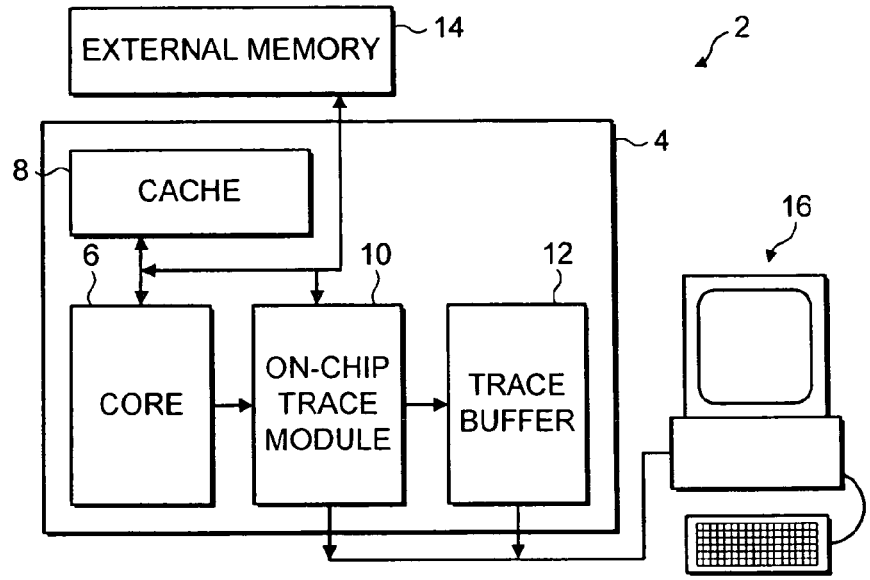
FIG. 1 schematically illustrates a data processing system providing on-chip tracing mechanisms.
FIG. 2 schematically illustrates the problem of data access misses when tracing data.

FIG. 1 schematically illustrates a data processing system 2 providing a on-chip tracing mechanism. An integrated circuit 4 includes a microprocessor core 6, a cache memory 8, an on-chip trace module controller 10 and an on-chip trace buffer 12. The integrated circuit 4 is connected to an external memory 14 which is accessed when a cache miss occurs within the cache memory 8. A general purpose computer 16 is coupled to the on-chip trace module controller 10 and the on-chip trace buffer 12 and serves to recover and analyse a stream of tracing data from these elements using software executing upon the general purpose computer 16.

It is often the case that the processor core 6 may, during operation, need to access more data processing instructions and data than there is actually space for in the external memory 14. For example, the external memory 14 may have a size of 1 MB, whereas the processor core 6 might typically be able to specify 32-bit addresses, thereby enabling 4 GB of instructions and data to be specified. Accordingly, all of the instructions and data required by the processor core 16 are stored within external storage, for example a hard disk, and then when the processor core 6 is to operate in a particular state of operation, the relevant instructions and data for that state of operation are loaded into the external memory 14.

FIG. 2 illustrates various behaviour in response to data access instructions that may occur within the system of FIG. 1. The processor core 6 in this case is an ARM processor executing ARM object code instructions. The first code sequence in FIG. 2 illustrates a load instruction 18 which loads data into a specified register from the memory location specified by an address given in another register $R_m$. In this case, the data access instruction results in a hit within the cache memory 8 and the corresponding data value from the address specified by the register $R_m$ is returned on the same cycle to the processor core 6.

In the second example, the same instruction sequence is issued, but in this case the instruction 20 results in a miss within the cache memory 8. The integrated circuit 4 is designed to cope with this behaviour and continues to execute the instructions following the load instruction 20 that gave rise to the miss providing those subsequent instructions do not require the missed data. At a variable time later, the data corresponding to the access miss is returned on the data bus of the system. The late data will be routed to the correct register and any register interlocking will be cleared. It will be appreciated that the delay until the late data is returned can vary depending on the particular circumstances. The integrated circuit 4 could be coupled to a multilevel external memory system, such as comprising a relatively fast off-chip cache memory in front of a larger but slower main RAM memory providing further storage. The mechanisms for enabling an integrated circuit itself to cope with such variable delay late data are known in the field, the technique of the present invention seeks to provide mechanisms which at least in their preferred embodiments also allow the tracing of data to also cope with such late returned data and variable delay data.

The third code sequence in FIG. 2 has two load instructions 22, 24 that both result in data misses and have corresponding late data returned. In this example, the late data returned on the data bus out of order from the sequence of the data access instructions 22, 24 that gave rise to it. Accordingly, the first missing data access 22 corresponds to the second late data item 26 whereas the second missing data access 24 corresponds to the first late data item 28.

FIG. 3 illustrates the behaviour of the on-chip trace module controller 10 in response to data access instructions that give rise to data misses. The on-chip trace module 10 writes its trace data at high speed into the on-chip trace buffer 12. This enables the tracing to occur in real time keeping pace with the full speed execution of instructions by the processor core 6. At a later time the general purpose computer 16 may read the contents of the trace buffer 12 to analyse the trace data.

As illustrated in FIG. 3, a first load instruction 30 results in a data miss within the cache memory 8. Accordingly, a data place holder 32 is inserted into the data trace stream at the corresponding point to the instruction 30 within the instruction trace stream that gave rise to the miss. This data place holder 32 has an associated tag value (Tag1) that identifies that data place holder. At a later time, a further data accessing instruction 34 results in a hit with the data value 36 being returned in the same processing cycle and placed within the data trace stream at a point directly matching the instruction 34. The next instruction 38 results in a further data miss and the insertion of a further data place holder 40 with a different identifying tag value (Tag2).

At a variable time later two late data values 42, 44 are returned on the data bus and inserted into the data trace stream. Each of these late data values has a tag value associated with it that enables it to be matched to a corresponding data place holder earlier within the data trace stream. In this particular example, the late data values are returned out of order with the data misses that gave rise to them. Accordingly, the first late data value 42 returned has a tag value of Tag2 and corresponds to the data place holder 40 and the instruction 38. The second late data value 44 has a tag value of Tag1 and corresponds to the data place holder 32 and the instruction 30.

It will be appreciated that the analysis of the data place holders and the late data values takes place outside of the integrated circuit 4 using the general purpose computer 16. The general purpose computer 16 can under program control search the data trace stream for data place holders with corresponding tag values and then replace these with later identified late data values with matching tags such that a proper correspondence can be drawn between instructions and the corresponding data returned. In the full trace analysis the late data value may be left in its position at which it was returned in order that the effects of the delay of the return may also be properly understood within the tracing environment with the tag matching being used to properly relate these late data values back to the matching instructions.

Having defined the behaviour of the instruction trace stream and the data trace stream, the control logic within the on-chip trace module controller that provides this functionality can be derived in accordance with standard techniques and standard integrated circuit design tools.

FIG. 4 illustrates a further embodiment. In this example, the data place holders do not include tag values, but instead indicate the number of pending late data values outstanding when they are themselves inserted into the data trace stream. Accordingly, the data miss resulting from instruction 46 results in a data place holder 48 indicating zero pending late data values. The next instruction 50 resulting in a miss occurs before the late data value corresponding to the data place holder 48 has been returned and accordingly the data place holder 52 indicates that there is already one pending late data value outstanding. The late data value 54 corresponding to the instruction 46 is then returned before a further instruction 56 resulting in a miss is executed. When the instruction 56 is executed, the number of outstanding late data values will still be one and accordingly the data place holder 58 is marked to indicate this.

Figure 5:
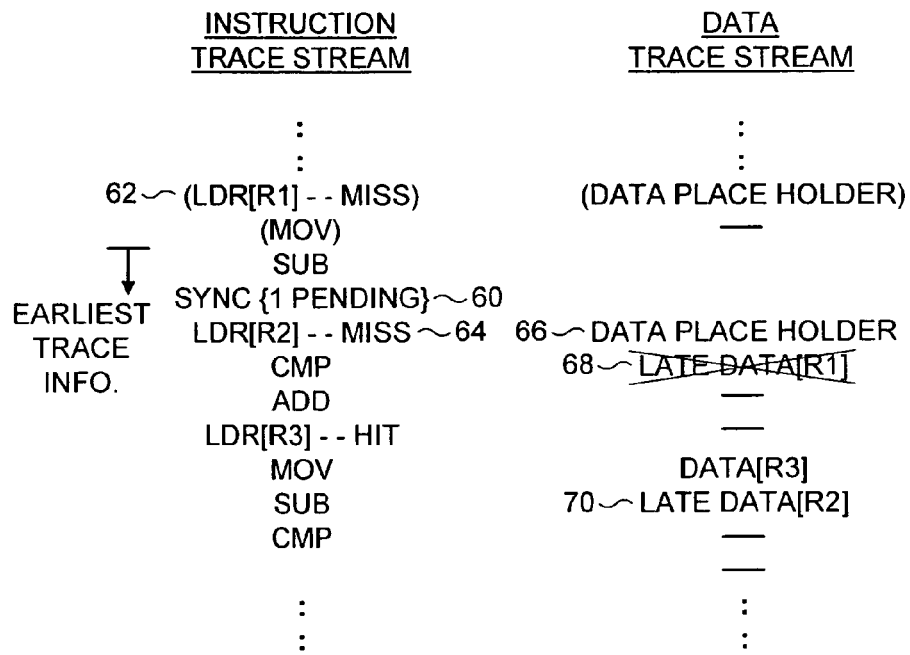

The data trace stream format shown in FIG. 4 allows the analysis of this trace stream to be picked up from a variable position and not be confused by late data values being returned for points prior to the start of the trace stream, but requires misses to be returned in order (as does the FIG. 5 embodiment).

FIG. 5 illustrates a further example trace stream format. In this example, synchronising data 60 is periodically inserted within the stream of traced data. This synchronising data indicates the number of outstanding late data items at that point of time. Accordingly, the synchronisation data item 60 indicates one pending late data item corresponding the missed data access instruction 62. The data place holders in this example do not include additional information specifying the instruction to which they correspond.

A load instruction 64 following the synchronising data item 60 also results in a miss with a corresponding data place holder 66 being inserted within the data trace stream. The first late data item returned 68 is ignored since the synchronising data element 60 tells us that it corresponds to an untraced earlier instruction 62 that resulted in a miss and accordingly cannot be properly analysed. When the next late data item 70 is returned, then this is determined to correspond to the load instruction 64.

Figure 6:
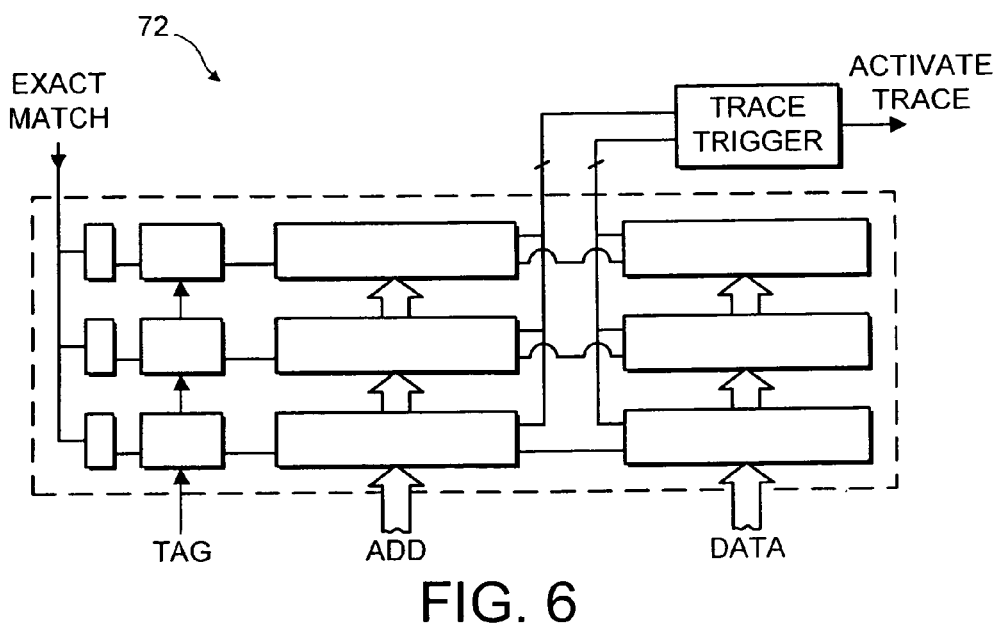
FIG. 6 illustrates a trace trigger mechanism.

FIG. 6 illustrates a circuit element 72 that may be used to trigger tracing control operations. This circuit element 72 comprises a plurality of comparitors which may be loaded with predetermined values, and possibly associated masks, for comparing current bus and address data values in order to trigger appropriate trace watch points.

In the context of late returned data, a data watch point will be configured to either be an exact match watch point or a non-exact match watch point. An exact match watch point will not be triggered until the late data is returned and found to match the criteria that have been specified. Conversely, a non-exact match watch point will be triggered when a data miss for that data value occurs upon the assumption that the late data when it is returned will result in a match. The configuration of the watch points to either of these two behaviours may be controlled by the user of the trace system as desired. A tag value corresponding to the late data values is also held within the watch point comparitor system in order to make the link between late data values returned and the corresponding addresses to which they relate.

Figures 7, 8:
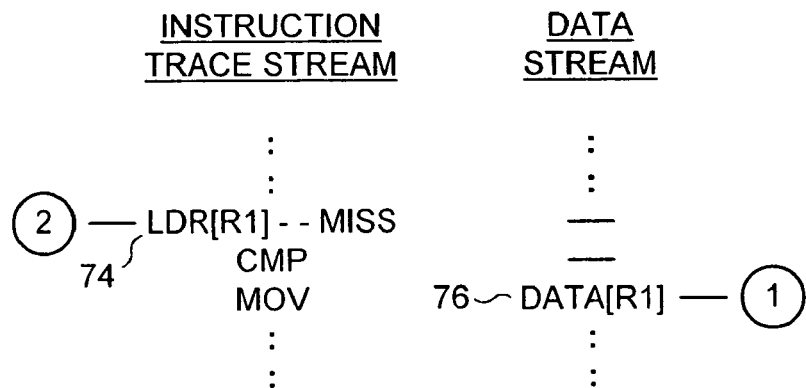
FIGS. 7 and 8 illustrate example behaviour of a trace trigger mechanism that may be configured to cope with data access misses.

FIGS. 7 and 8 schematically illustrate the different types of behaviour that may result from the system of FIG. 7. An instruction 74 results in a data miss. The data 76 is subsequently returned on the data but at a later time.

FIG. 8 assumes that a watch point has been set up to the address corresponding to that specified within the instruction 74 and accordingly an address match occurs for all of the possibilities indicated. In the first two possibilities, the watch point has set up to be an exact match watch point. Accordingly, in the first two examples the tracing event will not trigger until the data 76 has been returned and found to match. The first row of FIG. 8 indicates a data match and the tracing activation point will be point P1 in FIG. 7. In the third and fourth rows of FIG. 8, the watch point is set up as a non-exact watch point. Accordingly, in both of these cases the trace control will be triggered upon occurrence of the address match at point P2 irrespective of whether or not the data match subsequently occurs. It will be appreciated that in the fourth row the trace point has been triggered even though the data match did not subsequently occur.

The exact match signal can be controlled and used in various ways, e.g. making the exact match signal configurable depending on requirements (this may be preferred); choosing the exact match signal within hardware depending on the use the comparison is to be put; and making the comparison hardware capable of providing both behaviours simultaneously, using different behaviours in different parts of the tracing circuit as appropriate.

Figure 9:
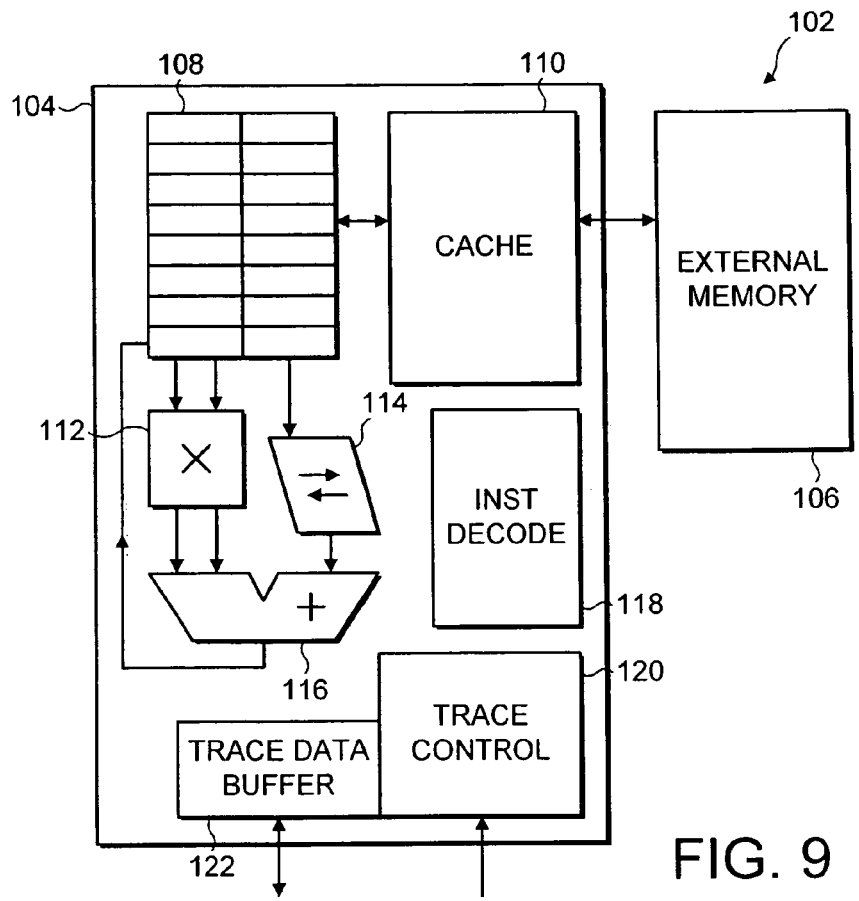
FIG. 9 schematically illustrates a data processing system supporting a tracing mechanism and multi-word data transfer instruction.

FIG. 9 illustrates a data processing system 102 including a microprocessor integrated circuit 104 and an external memory integrated circuit 106. The mircoprocessor integrated circuit 104 includes among its many different circuit elements (not all of which are shown) a register bank 108, a cache memory 110, a multiplier 112, a shifter 114, an adder 116, an instruction decoder 118, a trace controller 120 and a trace data buffer 122.

In operation, the instruction decoder 118 receives program instruction words and then generates control signals that are used by the other elements within the microprocessor integrated circuit 104 to control the operation of those elements. A particular instruction may involve the performing of an arithmetical logical operation upon values held within the registers of the register bank 108 using one or more of the multiplier 112, the shifter 114 and the adder 116. Another type of data processing instruction to which the instruction decoder is responsive is a multi-word data transfer instruction. An example of such a type of instruction are LSM-type instructions (load store multiple) provided by microprocessors such as the ARM7 and ARM9. Details of the operation of these example multi-word data transfer instructions may be found in the Data Sheets for the above microprocessors, for example LDM and STM instructions.

The trace controller 120 and the trace data buffer 12 are provided on-chip to the microprocessor integrated circuit 104. The trace controller 120 provides many different types of operation included within which is the initiation of tracing operations when trace triggering conditions are detected. The trace controller may "snoop" the address and data buses within the system to detect particular address values and data values or may be responsive to signals controlling the register bank 108 to detect accesses to a particular register within the register bank 108. In any of these cases, the trace controller 120 may serve to initiate tracing operation when a predetermined condition is detected and cause a trace data stream to be stored within the trace data buffer 122. This stream of trace data may subsequently be downloaded from the trace data buffer to an external trace data buffer analysing system where it may be examined and interpreted by a person wishing to debug the system or understand its separation more completely.

Figure 10:
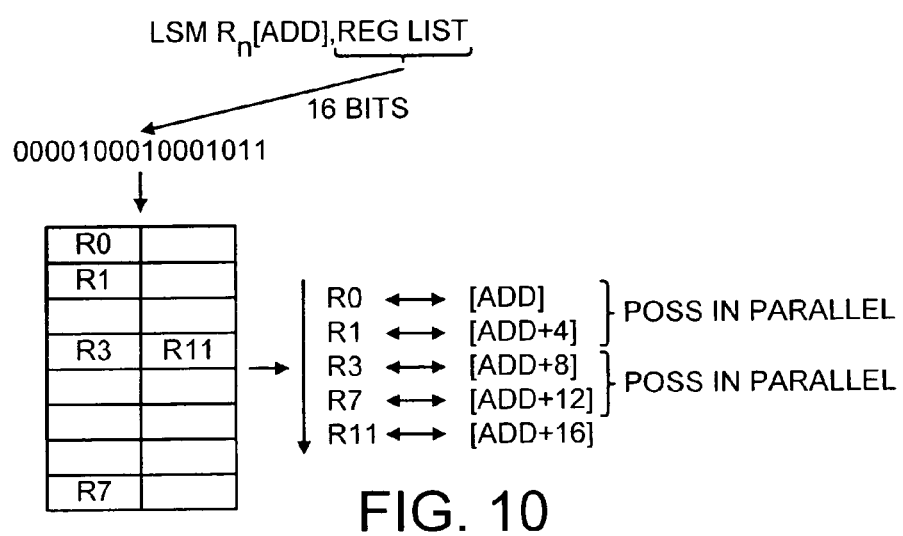
FIG. 10 schematically illustrates a multi-word data transfer instruction.

FIG. 10 illustrates a multi-word data transfer instruction, an LSM instruction as mentioned above. Within the fields that control the operation of this instruction is a pointer to a register $R_n$ within the register bank 108 that controls a memory address storing data values which will provide the starting point for the multi-word transfer of the instruction. The instruction also includes a 16-bit field with one bit corresponding to each of the sixteen registers within the register bank 108. A value of "1" at a particular bit position indicates that a data transfer is to take place for that register and accordingly any number of data transfers between one and sixteen can be specified by a single LSM instruction. In the example illustrated, the register list specifies that five data words are to be transferred between the memory addresses starting at the value held within the register $R_n$ and the registers R0, R1, R3, R7 and R11. The transfers start with the lowest numbered register and progress with a memory increment of four bytes for each transfer.

As illustrated in FIG. 10 high performance embodiments of the data processing system 102 may serve to transfer two data values in parallel from the memory systems (either the cache memory 110 or the external memory 106) to their respective registers. This will allow an LSM instruction to complete more rapidly and speed overall processing. Within such embodiments care must be taken such that the programmer's model whereby the data transfers occur sequentially is not violated and this is represented in the trace data. In addition, address trigger points must be sensitive to both values.

Figure 11:
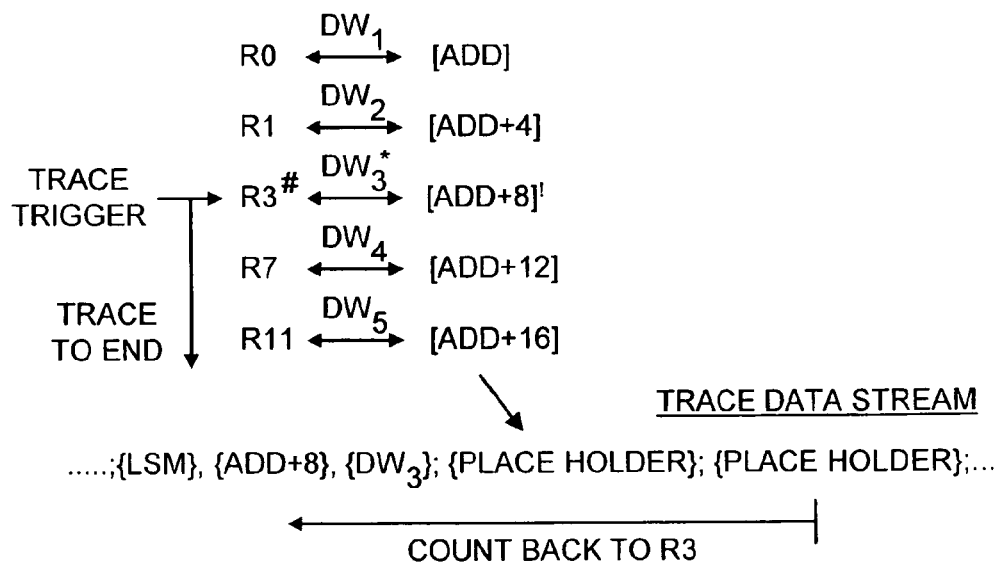
FIG. 11 schematically illustrates a trace trigger point occurring partway through a multi-word data transfer instruction and the resulting trace data stream.

FIG. 11 develops the example of FIG. 10 and uses this to illustrate the triggering of a predetermined trace initiating condition partway through the multi-word data transfer instruction LSM. In particular, the third data transfer of the data word $DW_3$ between the register R3 and the memory location Add+8 gives rise to a trigger. The trigger could be from the particular register being accessed as indicated by the "#", from the data value being transferred as indicated by the "*", or from the memory location being accessed as indicated by the "!". It is also possible that multiple of these conditions could be simultaneously met resulting in the trace triggering occurring at that point within the multi-cycle multi-word data transfer instruction.

The trace controller 120 detects the trace trigger condition and initiates tracing operation by writing a trace data stream of trace data to the trace data buffer 122 starting from the transfer that triggered the trace. In particular, the multi-word data transfer instruction itself is written into the trace data stream followed by the address value and the data value that gave rise to the trace trigger. The remaining data transfers up to the end of the multi-word data transfer instruction (which may be a write or a read) result in trace data being added to the trace data stream. In order to preserve trace data stream bandwidth place holder data codes may be inserted for each of these transfers up to the end of the LSM instruction rather than including more detailed information. The place holder codes may be used by a later analysing system to count back to the register which initiated the trigger and thereby identify the register concerned. It will be appreciated that the trace controller 120 may be arranged to only trace the triggering transfer itself and its subsequent transfers within the same instruction with no subsequent tracing of later instructions or alternatively may be arranged to turn on tracing that remains turned on from that point forward. Both of these and other possibilities will be apparent to those in the field. In addition it would be possible to trace values for a subset of the transfers following the trigger point with placeholders being used for the remainder.

Figure 12:
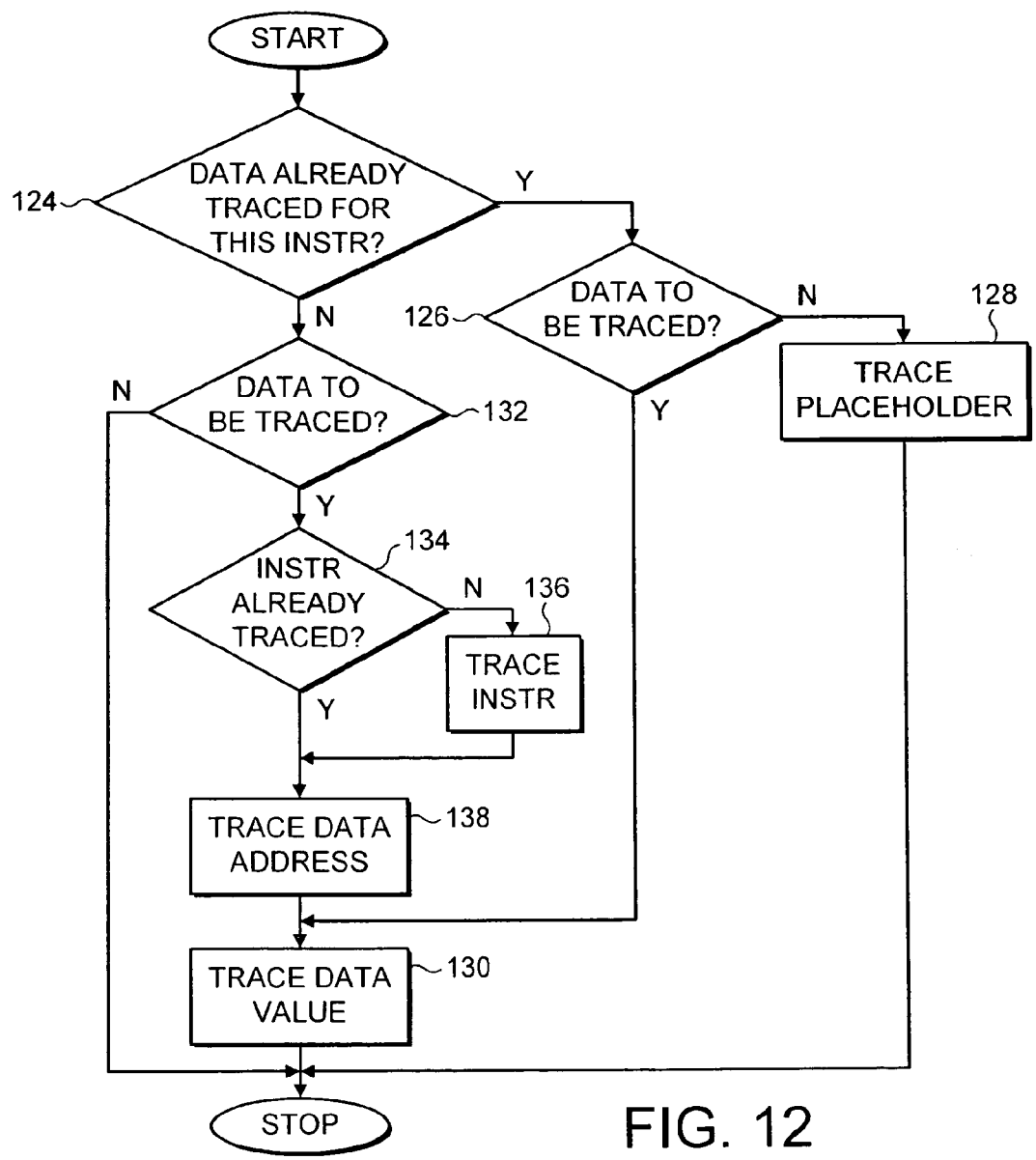
FIG. 12 is a flow diagram illustrating the flow of control within the on-chip tracing hardware.

FIG. 12 schematically illustrates the control operation that may be performed by the trace controller 120 for every transfer that takes place. At step 124 the trace controller 120 determines whether or not data is already being traced for this traced, then step 126 checks whether a full data value or a placeholder should be output in the trace. Step 128 outputs a placeholder or alternatively step 130 outputs a data value.

If step 124 determines that data is not currently being traced, then step 132 determines whether or not a trigger condition is met such that the transfer should now be traced. If a trigger point is not tripped, then processing for this transfer stops. If tracing of the transfer is to start, then step 134 determines if the instruction itself has already been traced, e.g. tracing of all instructions may already be switched on with only this data transfer being traced. If the instruction needs outputting, then this is done at step 136 before processing proceeds to step 138 at which the address value is output prior to outputting the data value at step 130. Addresses for transfers subsequent to the first may be inferred.

Figure 13:
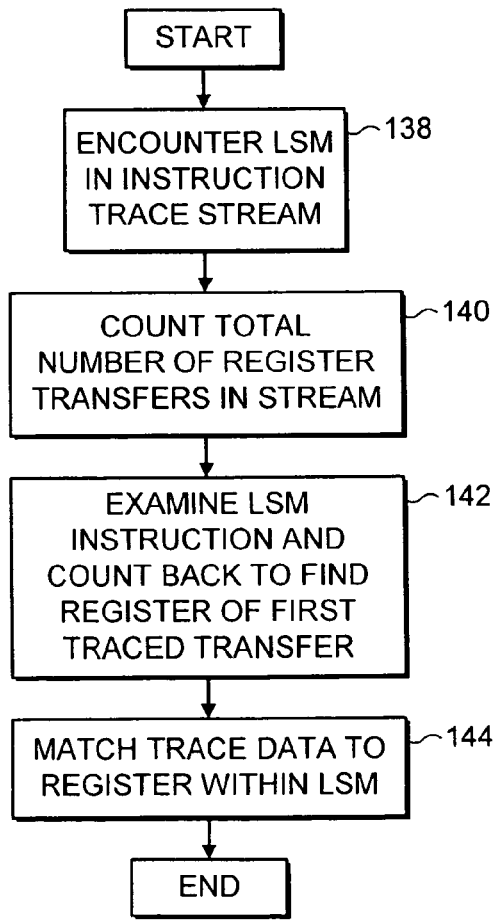
FIG. 13 schematically illustrates the processing operations that may be performed in the system for analysing the trace data generated in accordance with the system of FIGS. 9 to 12.

FIG. 13 schematically illustrates the processing that may be performed within a trace data analysing system responsive to the trace data stream produced in accordance with the embodiment described above. At step 138 an LSM multi-word data transfer instruction is encountered within the trace data stream (or at least the instruction portion of the trace data stream). At step 140 the analysing system counts through to the end of the transfers marked within the trace data stream for that LSM instruction until the final data transfer and total count of the data transfers is established within the trace data stream.

Given the count of the data transfers within the trace data stream, step 142 serves to examine the register list field within the instruction and count back from the last data transfer to identify the data transfer that triggered the tracing. Thus, at step 144 the analysing system can match the trace data $DW_3$ and Add+8 to the register with which it corresponds.

A further description of the tracing techniques of at least preferred embodiments of the invention are given in the following architectural description, which should be read in conjunction with the Embedded Trace Macrocell description publicly available from ARM Limited, Cambridge, England under reference ARM1H1 0014H (the contents of which are incorporated herein by reference):

(a) Terms and Abbreviations

This document uses the following terms and abbreviations.

| Term | Meaning |
| --- | --- |
| Current protocol | ETM protocol used for ETM7 and ETM9 |
| New protocol | Protocol for ETM10 |
| ETM packet | Several bytes of related data placed into the ETM FIFO in a single cycle. Up to 3 packets can be placed into the ETM10 FIFO in one cycle |
| Packet header | The first byte of an ETM packet that specifies the packet type and how to interpret the following bytes in the packet |
| CONTEXT ID | A 32 bit value accessed through CP15 register 13 that is used to identify and differentiate between different code streams. This value was previously referred to as the Process ID in ETM7 and ETM9 documentation. The name has changed to avoid confusion with the 7 bit FCSE PID register, which is also located in CP15 register 13 and has also been referred to as Process ID. |
| Trace Capture Device | Any device capable of capturing the trace produced by the ETM: a TPA, a logic analyser, or an on-chip trace buffer. |
| LSM | Load or Store Multiple Instruction: LDM, STM, LDC or STC instruction |

Scope

This document is intended to specify the functionality of the ETM10. ETM10 is a real time trace module capable of instruction and data tracing. Functionality is similar to that of previous ETM implementations for the ARM7 and the ARM9. It is assumed that the reader is familiar with the original ETM specification which is outlined in the Embedded Trace Macrocell Specification (ARM IHI 0014D). This specification is not intended to restate the common architectural features between ETM10 and previous ETM versions, but rather to discuss the portions of the ETM specification that change for ETM10. Most of these changes involve the creation of a new ETM protocol that is capable of properly tracing ARM1020E . This protocol is intended to be extensible for tracing future ARM cores as well.

Introduction

The Embedded Trace Macrocell is an integral part of ARM's Real Time Debug solution which includes the ETM, a trace port analyser, and a software debugger (such as ADW).

An Embedded Trace Macrocell consists of two parts, a trace block and a trigger block. The trace block is responsible for creating the compressed trace and outputting it across the narrow trace port. The trigger block contains programmable resources that allow the user to specify a trigger condition. The trigger block resources are also used as a filter to control which instructions and which data transfers are traced. All ETM configuration registers (including the trigger block resources) are programmed through the JTAG interface. The user accesses these registers using a software debugger. Once the trace has been captured, the debugger is also responsible for decompressing the trace and providing with user with a full disassembly of the code that was executed. Since the debugger software would not be capable of processing the ETM trace port output in real time, the trace is initially captured into an external Trace Port Analyser (TPA). The TPA may be a fully functional logic analyser, or an ETM specific device such as the Agilent nTrace box. The debugger extracts the trace information from the TPA once the trigger condition has occurred and the debug run has completed. At this high level of description, ETM10 is functionally identical to ETM7 and ETM9.

Changes Required for Etm10

From a user's view, ETM10 will provide equivalent instruction and data tracing capability to that provided by ETM7 and ETM9 with just a few minor differences. This section describes the changes that are being made to the ETM architecture for ETM10 and why they are being made. Many changes affect only the decompression software and are invisible to the rest of the trace toolkit software as well as the end user. However, some changes do affect the programmer's model or result in minor differences in tracing behaviour from ETM7 and ETM9. Such changes are noted in this section. Any changes for ETM10 that require in-depth explanations of the new protocol are covered more thoroughly in the protocol description given in section 5.

(b) Branch Phantom Tracing

ARM10 implements "branch folding" which means a branch can be predicted, pulled out of the normal instruction stream, and effectively executed in parallel with the next instruction in the program. These folded branches are referred to as branch phantoms. The PIPESTAT encodings in the old protocol only account for one instruction executed per cycle. To allow branch phantoms to be traced, new encodings will be added to the PIPESTAT field that represent a folded branch in parallel with an instruction. The new PIPESTAT values are given in the ETM10 protocol specification in section 5.

Folded branches require changes to the trigger block as well. When a branch is folded, effectively two instructions are executed in parallel. Since the PC value for these two instructions is not guaranteed to have any identifiable relationship, two address comparisons must be made each cycle. This implies that each address register will require two comparators. For proper instruction tracing, this also implies that two TraceEnable outputs will need to be generated by the Trigger block. One TraceEnable output is for the phantom address and one is for the address of the normal instruction. Supporting two trace enable signals allows for proper tracing when tracing of only one of the two instructions (the phantom branch or its target) is desired. With only a single TraceEnable output both instructions would have to be traced. It also ensures proper tracing in the rare case where the branch phantom address causes trace to turn on, and the branch target instruction address causes trace to turn off. If two TraceEnable signals were not supported, then this case would cause tracing to be enabled and remain enabled since a trace on indication combined with a trace off indication in the same cycle results in trace remaining on. Note that these two TraceEnable outputs are an internal feature invisible to the user and the trace tools. The only reason for two TraceEnables is to allow tracing to behave as if instructions were executed serially.

There is only a single compare output for the event block. The enabling event shall be active if either of the instructions that occur during the cycle causes it to be. It is not felt that there is much loss of functionality here due to the way events are typically used. Counters can only count down once per cycle, but counting has only ever provided an accurate count of accesses when single address comparators are used. Furthermore, there is no loss of functionality to the Trigger, TraceEnable, ViewData or ExtOut events: here the event will be active if either instruction or data transfer would have individually caused it to be active, which is the desired behaviour. If the sequencer receives multiple transition requests in the same cycle, no transitions will take place and the sequencer remains in the original state. This behaviour is identical to that of ETM7 and ETM9. However, ETM10 may have more occurrences of multiple transition requests in a cycle since ARM10 supports more parallel execution. The user will need to be aware of this behaviour when programming the sequencer, but there is a workaround for simple events. If the desired behaviour is to transition from state 1->2 based on event A and from state 2->3 based on event B, program 1->2 to occur on event (A & !B), 2-1 >3 on event B, and 1-31 >3 on event (A & B). Programming the sequencer in this way insures the proper handling of simultaneous occurrence of event A and event B.

(c) Load Miss Tracing

ARM10 has a non-blocking data cache that allows other instructions, including other memory instructions, to execute underneath a single outstanding miss; thereby allowing the data cache to return data to the core out-of-order. This feature is an issue for tracking load data since the current protocol expects load data to be placed in the FIFO in-order. Data packets are now prefixed by a header byte in part to accommodate out-of-order load miss data. Header bytes are described in detail in section 5.

Supporting a non-blocking cache also requires changes to data comparators. Like ETM7 and ETM9, ETM10 has data comparators which are used in conjunction with a pair of address comparators. When used, the comparator will only trigger a match when the data matches as well. Since other memory accesses can occur underneath a miss, a bit is added to each comparator to remember whether or not the address for a load request that resulted in a miss matched. When the load miss data is returned, the data value comparison is done, and the saved address match bit is used to qualify the results of the comparison. This match bit is then cleared. In some cases, the user may not wish to wait for miss data to be returned to enable the comparator. Instead, they may want load misses to always be traced based on the data address only. To support both usage models, a bit has been added to the address access type register to allow the user to specify which mode is enabled for each comparator. The user should set bit 8, the Exact Match bit, of the address access type register if waiting for load miss data on a comparison is desired. (Refer to reference 1 for more information on the access type registers.) Waiting for the data compare to occur is useful when data values are used to create triggers and other events. Tracing load misses based on the address alone is useful when the comparator is used for trace filtering and some extraneous tracing is not considered to be a problem. The user should be aware that using data values to create an event, such as a sequencer transition, could result in out-of-order events occurring since the load data may be returned out-of-order. If the user has concerns that ARM10's non-blocking cache may affect programmed events, this feature may be disabled in the core through writes to the cp 15 configuration register (r1). Refer to the ARM1020E TRM (reference 3) for more information.

Bit 8 of the access type register is also used to specify comparator behaviour when data aborts occur. If an access results in a data abort and bit 8 is asserted, the comparator will NOT result in a match output, regardless of whether or not a data match is requested. This behaviour is often desired when a comparator is meant to fire just once since aborted accesses are usually reattempted once the aborting condition has been resolved.

When bit 8 is not asserted, an aborted data access will result in a match based purely on the address (i.e. the data value compare is forced to match). Masking out access that abort can be useful when creating triggers and other one-time events. The same bit is used for determining proper handling of load misses and data aborts since the desired behaviour would typically be the same for both cases. The default value for the Exact Match bit is zero.

(d) 64 Bit Data Tracing

ARM1020E has a 64 bit data bus capable of returning 64 bits of data in a single cycle. This data must be 64 bit aligned, but it may either be considered two 32 bit integer values, or a single 64 bit floating-point value depending on the context. To support this 64 bit data bus, ETM10 must be capable of tracing two adjacent data values in a single cycle. To support tracing just one value or the other, two ViewData outputs are now generated in a similar manner to the two TraceEnable signals described in section 4.1. Also like the TraceEnable logic, there is only one ViewData output used for the event hardware. This can affect the counter and sequencer logic since two adjacent 32 bit requests that are accessed in the same cycle will only result in one decrement of the counter or only one state change by the sequencer. This should be taken into account by the user programming the event logic. Since VFP10 and possibly other ARM10 coprocessors can have single 64 bit data values, it is useful to have the ability to filter tracing or set triggers based on a 64 bit data value. To account for this, ETM10 expands the data compare registers and data mask registers out to 64 bits. Currently the data comparators appear in the programmer's model as registers 0x30, 0x32, 0x34 etc. corresponding to one per address range comparator, with the masks at 0x40, 0x42, 0x44 etc. These registers will now hold the lower 32 bits to be compared, while registers 0x31, 0x33, etc. will hold the upper 32 bits, with associated masks at 0x41, 0x43 etc. It will no longer be possible to have more data comparators than address range comparators (although this has never been available in any of the supported configurations.)

When 32 bit data values are to be compared, the trace tools will need to program the same value into both the low and high data registers. This register programming should be transparent to the end user. To fully support 64 bit data comparisons, a minor change to the programming model is also required. The access type register now observes bit 7 which, if set, causes the address comparator to match only if the full 64 bit data value matches. Setting bit 7 results in unpredictable behaviour if the data comparator has not been enabled via access type bits [6:5]. Note that, since there is only one 64 bit data comparator per pair of address registers, access type bits 8:5 are only valid for use in the even numbered registers (assuming the registers are numbered 0 to 15).

(e) LSM Tracing

The ARM 1020E has an independent load/store unit which allows other instructions to execute underneath a load or store multiple instruction, hereafter referred to as an LSM, while the load/store unit iterates through the data accesses. (i.e. executing an LSM does not stall the core). To support this, some changes are required to the address comparator output and to the assertion of TraceEnable:

Whenever an address comparator matches on an instruction address for an LSM, it will be forced to remain asserted for the entire duration of the instruction, even as other instructions enter the core. This is important since the desired behaviour in this case would be to trace the entire LSM, including its data if appropriate. This has the side effect of causing other instructions executed underneath the LSM to be traced regardless of whether or not they otherwise would have been.

Once a data transfer associated with an LSM has been traced subsequent transfers associated with that instruction that would not normally be traced will have a placeholder packet output (Value Not Traced—see section 5.) Note that this is true even if TraceEnable is deasserted before the multiple memory instruction completes.

The ETM protocol allows for instruction tracing to be enabled based on load/store data addresses (and data values). Since on ARM10, the LSM instruction may no longer be in the core's execute stage when the tracing enabling event occurs, this instruction address will need to be kept around and broadcast in a special way to support this feature. This is accomplished using the LSM in Progress TFO packet. Trace Packet Offsets are described in section 5.2.4.

(f) Auxiliary Data Tracing

The addition of data headers to the protocol also allows for the tracing of auxiliary data types (i.e. the tracing of data values other than those for load, store, and CPRT instructions). This auxiliary data type tracing is meant to allow for expansion of ETM tracing, which may include the tracing of external ASIC data in future versions of the ETM. More information is given on auxiliary data tracing in the data headers discussion in section 5.

(g) CONTEXT ID Tracing

CONTEXT ID values need to be broadcast whenever they are updated and whenever a TFO packet is required for synchronisation. For ETM10, CONTEXT ID values are output when they are updated by simply enabling data tracing for the CPRT instruction that resulted in a CONTEXT ID change. The decompressor will be able to recognise that the instruction is a CONTEXT ID instruction (MCR c15, 0, rd, c13, c0, 1) and thereby know that the traced data is the new CONTEXT ID. The ETM also broadcast the current Context ID value whenever trace is enabled, and during trace synchronisation cycles which are described in section 5.2.4.

Rather than requiring another 32 bit port on the ARM10<-->ETM10 interface, ETM10 recognizes Context ID updates and maintains the current Context ID value in an internal shadow register. To properly maintain coherency, this register will always be updated, even when the ETM is in POWRDWN mode. (ETM register 0x4, bit 0 is asserted).

Using CONTEXT ID values for trace filtering is being added as an additional feature for ETM10. This will be implemented via a new set of programmable registers in the ETM in which an expected CONTEXT ID value can be specified:

| Register encoding | Description |
| --- | --- |
| 110 1100 | CONTEXT ID value 1 |
| 110 1101 | CONTEXT ID value 2 |
| 110 1110 | CONTEXT ID value 3 |
| 110 1111 | CONTEXT ID mask value |

The same mask is used for each CONTEXT ID comparator, and works in the same way as data comparator masks.

Bits 10:9 of the address comparator access type registers will indicate whether CONTEXT ID comparators are used. A value of 00 causes the CONTEXT ID comparators to be ignored. A value of 01, 10 or 11 causes the address comparator to match only if the current CONTEXT ID matches that in CONTEXT ID comparator 1, 2 or 3 respectively, after taking account of the CONTEXT ID mask.

New event resources will be allocated to allow the CONTEXT ID comparators to be accessed directly from within the event block (see section 3.3.4 of ARM IHI 0014D). These new resources will be mapped to 0x58–0x5A:

| Bit encoding | Range | Description |
| --- | --- | --- |
| 101 | 0x8 to 0xA | CONTEXT ID comparator matches |

A new field will be added to the ETM configuration code register to indicate the number of CONTEXT ID comparators present (see section 4.2.2 of ARM IHI 0014D):

| Bit numbers | Valid Range | Description |
| --- | --- | --- |
| 25:24 | 0 to 3 | Number of CONTEXT ID comparators |

(h) Trace Output Frequency

The ARM1020E Macrocell will be capable running at core frequencies beyond 300 MHz. Previous ETM implementations have not pushed frequencies beyond 200 MHz. The maximum output frequency attainable for an ETM trace output is dependent upon the maximum sample frequency of the trace analyser and the maximum output frequency attainable at the pads. Agilent and Tektronix analysers can capture at a maximum frequency of 333 MHz and 400 MHz, respectively. However, it is highly unlikely that any CMOS pads available from ARM partners will be capable of providing clean, traceable signals at this frequency. Therefore, the pads are expected to be the speed-limiting factor. Some speed improvements can be obtained by using larger pads and/or using board level buffering. These techniques may allow us to trace reliably at 200 MHz. For tracing at higher speeds, there are two options. We can double the pin count and halve the frequency (a demultiplexed trace port), or we can utilise an on-chip trace buffer. Both techniques have positive and negative points.

Doubling the pin count is not an attractive option to some partners due to package limitations and the high cost of additional pins. This technique will also require changes to the TPA, and, most likely, the addition of a second mictor connector which takes up more board area and adds more cost. Furthermore, this technique still has a speed limitation of 400 MHz. An ARM10 processor fabricated in a hot process will most likely exceed these speeds.

The on-chip buffer has the advantages of tracing reliably at the core clock speed and of not requiring any extra pins. In fact, if all trace capturing will be done utilising the on-chip buffer, then the externally visible ETM port can be eliminated since the on-chip buffer would be downloaded via Multi-ICE through the JTAG port. The disadvantage of this solution is that the size of the on-chip buffer is typically quite small, on the order of 8–16 KB. Therefore, tracing depth is limited. Larger on-chip trace buffers are possible, but directly impact the size of the ASIC, and even a small trace buffer may use more silicon space than can be afforded in some designs.

Due to the varying advantages and disadvantages of each method, both of the options listed above are planned to be supported. The ARM10200 rev 1 test chip will be built with a demultiplexed trace port for high-speed tracing. An on-chip trace buffer will not be part of the ARM10200 rev 1 test chip. However, an FPGA implementation of the on-chip buffer will be available for functional testing. Future revisions of ETM10 will have on-chip trace buffers. A specification for an on-chip trace buffer for ETM9 has been written, and an implementation is in progress. An ETM10 compatible on-chip trace buffer will be similar, but will require minor changes to support the new 4 bit PIPESTAT encodings which are described in detail in section 5.2. Refer to reference 4 for more information on what Trace Capture Device changes are required to support ETM10. Depending on timescales, an ETM10 compatible on-chip trace buffer may offer additional features, such as dynamic trace compression.

(i) Synchronisation Register

In previous ETM implementations, synchronisation occurred via a five-byte instruction address every 1024 cycles, and a five-byte data address every 1024 cycles. For ETM10, these synchronisation points will be configurable via a new 12 bit programmable register. Configurable synchronisation makes it easier to utilise a full range of trace buffer sizes. Small trace buffers, such as the on-chip trace buffer, can synchronise frequently to avoid throwing away large portions of the trace, while larger trace buffers can synchronise infrequently to avoid wasting trace throughput on unneeded synchronisation. The default counter value will be 1024 cycles. To prevent data address and instruction address synchronisation from occurring concurrently, data address synchronisation will occur when the counter reaches its midpoint value and instruction address synchronisation will occur when the counter reaches zero. The address for the new synchronisation register is 0x78.

(j) Memory Map Decoder

The external memory map resource inputs that were present in previous ETM implementations are not being supported for ETM10. The extra complexities present in the ARM10 architecture make support for an external decoder more difficult to implement. External events can still control tracing by utilising the EXTIN inputs, which are now cycle accurate (discussed in section 4.15).

(k) Rangeout

Previous ETM implementations have been able to use data value compare registers inside the Embedded ICE logic as extra trigger resources. This functionality was accomplished by using the RANGEOUT outputs coming from the Embedded-ICE. The ARM10 debug unit does not have these RANGEOUT outputs since it does not have any data value compare functionality. Therefore, this resource reuse is not possible for ETM10. This has a minor impact on the programmer's model since these resources can no longer be programmed.

(l) Branches to Interrupt Vectors

The current protocol specifies that direct branches to entries in the interrupt vector table must be traced as indirect branches. This is no longer always possible as phantom branches cannot be converted into indirect branches within the proposed protocol. Therefore for consistency and simplicity direct branches to interrupt vectors will no longer be traced as indirect branches, regardless of whether or not the direct branch was a branch phantom.

(m) Protocol Version

The 4-bit ETM protocol version field present in the configuration code register (register 0x01) on ETM7 and ETM9 has been determined to be insufficient to support future protocol versions for the ETM. Therefore, a new ETM ID register has been defined that contains fields specifying the ARM core for which it is intended as well as minor and major protocol revision numbers. This register is mapped to register address 0x79 and is considered valid whenever bit 31 in the configuration register is set. This allows ETM7 and ETM9 to still use protocol variants 0–7 without requiring the ID register. The ETM ID register will contain a 16 bit value broken up into the following fields:

| Bit numbers | Description | Examples | |
|---|---|---|---|
| [3:0] | Minor protocol number | ETM 7/9 rev 0 = 0<br>ETM 9 rev 0a = 1<br>ETM 7/9 rev 1 = 2 | |
| [7:4] | Reserved | N/A | Note that, while the specified codes are reserved for ETM7 and ETM9 implementations, ETM7 and ETM9 will not necessarily support this register. |
| [11:8] | Major protocol number | ETM 7/9 =<br>ETM 10 = | |
| [15:12] | ARM Core | ARM 7 = 0<br>ARM 9 = 1<br>ARM 10 = 2 | |

ETM10 rev0 will have the ID value 0x2100.

(n) Trace On/Off Resource

A new event resource will be included to give the current state of the TraceEnable on/off logic. This shall be given resource number 101 1111 (see section 3.3.4 of ARM IHI 0014D), and shall be asserted whenever the Trace On/Off block is active.

(o) TPA Changes

All TPAs will need a minor change to support the new trigger and trace disable status values for ARM10. Namely, they must ensure that PIPESTAT[3]/TRACESYNC is LOW in order to detect TR and TD PIPESTATs. For logic analysers this is simply a minor software change. The Agilent nTrace will require minor hardware changes as well. To support high speed tracing through a demultiplexed, half speed ETM port, the TPA will need to be capable of capturing two core cycles worth of trace data in each cycle. This data will be broadcast across two Mictor connectors. Therefore, support for multiple connectors is required as well. For more information on these changes, please refer to reference 4.

(p) Precise Events

In ETM7 and ETM9, events generated via the Event block were imprecise, which means the user was not guaranteed to trace the data access or the instruction that generated the Event.

For ETM10 this is no longer the case. Assertion of ViewData and TraceEnable is always precise regardless of how it is generated.

(q) FIFO Size Determination

For ETM7 and ETM9 there has not been a way for the trace tools to determine the FIFO size. For ETM10, we have added the ability of determining the ETM's FIFO size using the FIFOFULL level register. For ETM10, this register has been made readable. When read, it returns the minimum of the value written into it and the FIFO size. Therefore, it is possible to determine the FIFO size by writing the maximum value into the register (0xFF), and then reading back the value. Once the FIFO size is known, the trace tools can then use this information to program a sensible value into the FIFOFULL level register.

(r) TRIGGER Output

If the processor is in monitor debug mode, DBGRQ will be ignored. Therefore, it is useful to have some other mechanism to allow the core to recognize that a trigger has occurred. For this purpose, a single bit TRIGGER output has been added to the ETM interface for ETM10. The TRIGGER output is asserted whenever the four-bit TRIGGER status is driven on the PIPESTAT bus. This signal can then be used by an interrupt controller to notify the core of the trigger via the assertion of an interrupt. The TRIGGER output can be left unattached if it is not needed.

ETM10 TRACE PORT

(s) ETM10 Port Signals

The ETM10 trace port consists of two signals, PIPESTAT and TRACEPKT, which are both valid on the rising edge of TRACECLK (which has the same frequency as GCLK.) PIPESTAT has been expanded for ETM10 from a 3 bit to a 4-bit signal to add encoding space for branch phantoms. TRACEPKT has not changed from the previous ETM versions; it can be 4, 8, or 16 bits depending on the configuration. The TRACESYNC pin has been removed from the protocol since synchronization is now achieved via another mechanism. The overall result is a trace port with the same pin count as previous ETM implementations.

(t) PIPESTAT Encodings

| Encoding | Mnemonic | Description |
|---|---|---|
| 0000 | IE | Instruction executed |
| 0001 | DE | Instruction executed, packet(s) have been placed on the FIFO |
| 0010 | IN | Instruction not executed |
| 0011 | DN | Instruction not executed, packet(s) have been placed on the FIFO |
| 0100 | WT | Wait: No instruction this cycle, valid data is on the trace port |
| 0101 | DW | Wait + data: No instruction this cycle, packet(s) have been placed on the FIFO |
| 0110 | TR | Trigger: Trigger condition has occurred, real PIPESTAT value is on TRACEPKT[3:0] |
| 0111 | TD | Trace disabled: no data on trace port |
| 1000 | PT_IE | Branch phantom taken + IE |
| 1001 | PT_DE | Branch phantom taken + DE |
| 1010 | PT_IN | Branch phantom taken + IN |
| 1011 | PT_DN | Branch phantom taken + DN |
| 1100 | PN_IE | Branch phantom not taken + IE |
| 1101 | PN_DE | Branch phantom not taken + DE |
| 1110 | PN_IN | Branch phantom not taken + IN |
| 1111 | PN_DN | Branch phantom not taken + DN |

(u) Branch Phantom PIPESTATs

The eight new branch phantom encodings are added to account for branch phantoms that are executed in parallel with the following instruction. These encodings should always be interpreted as the branch instruction being first in the execution stream. Only direct branches are predicted, so branch phantoms never place data packets in the FIFO. Folded branches that are mispredicted will result in a normal IE/IN PIPESTAT since any instruction that would have been executed in parallel was from the incorrect instruction stream and was therefore canceled.

(v) Data PIPESTATs

All mnemonics starting with 'D' mean that a data packet of some sort has been placed in the FIFO that cycle and will eventually be output on the TRACEPKT pins. Note that the word 'packet' for the new protocol refers to a multiple byte quantity that is placed in the FIFO rather than a single byte in the FIFO. The data packet may be a branch address, a load/store transfer, a CPRT transfer, or an auxiliary data packet. ETM10 is will place up to a maximum of three data packets in the FIFO in one cycle (two LDST/CPRT transfers and one branch address packet.) Note that three packets in one cycle is a limitation of the hardware, not the protocol. The need for separate data and branch PIPESTATs has been removed by the addition of packet header bytes to the protocol. The addition of DW and DN status values allows a data packet to be attached to any arbitrary cycle. This addition means that coprocessor maps for determining the length of LDCs/STCs are no longer necessary, and tracing of variable length LDC/STC instructions is now supported. Packet header bytes will be described in more detail in section 5.3.

(w) Instruction PIPESTATs

Non-wait PIPESTAT values, i.e. those that indicate an instruction was executed, are always given on the first cycle the instruction is executing. This distinction is important for LSM instructions that execute and return data for several cycles. Note that this behavior is different from previous protocol versions, which would give the executed PIPESTAT value on the LAST cycle the LSM was executed.

(x) TD Status and TFOs

A status of TD means that trace FIFO data is not present on the TRACEPKT this cycle. There two reasons why this could occur.

There is no data to be traced in the FIFO (if the FIFO is not empty, the status would be WT) In particular, this will occur shortly after trace is disabled until it is next enabled.

A TFO is being broadcast for ETM synchronization.

When a TD status is given on PIPESTAT, the decompression software will need to look at the TRACEPKT value to determine whether or not a TFO has been broadcast. TRACEPKT[0] is used to differentiate between cycle-accurate, and non-cycle accurate trace as is done in previous ETM implementations. As before, Trace Capture Devices may discard TD cycles where TRACEPKT[0]=0. If TRACEPKT [0] is asserted, TRACEPKT[3:1] is used to specify whether or not a TFO is broadcast. When a TFO is broadcast, TRACEPKT[7:4] specify the lower four bits of the TFO value. TRACEPKT[3:1] specify the remainder of the TFO value as given in the table below. TFO s are encoded in this way to maximize the range of valid TFO values.

| TRACEPKT [3:0] | Description |
|---|---|
| XXXXXXX0 | Trace disabled; non-cycle accurate |
| XXXX0111 | Trace disabled; cycle accurate |
| XXXX1001 | TFO value 0–15 (TRACEPKT [7:4] + 0) |
| XXXX1011 | TFO value 16–31 (TRACEPKT [7:4] + 16) |
| XXXX1101 | TFO value 32–47 (TRACEPKT [7:4] + 32) |
| XXXX1111 | TFO value 48–63 (TRACEPKT [7:4] + 48) |
| XXXX0001 | TFO value 64–79 (TRACEPKT [7:4] + 64) |
| XXXX0011 | TFO value 80–95 (TRACEPKY [7:4] + 80) |
| XXXX0101 | Reserved |

The TFO values given in the table on the left are generated based on the following simple formula:
TRACEPKT [7:4] = TFO[3:0]
TRACEPKT [3] = !TFO [6]
TRACEPKT [2:1] = TFO [5:4]

A TFO, or Trace FIFO Offset, is used when decompressing the trace information to synchronize between the pipeline status (PIPESTAT) and the FIFO output (TRACEPKT). TFOs are generated whenever trace is first enabled and whenever the instruction synchronization counter reaches zero. Trace FIFO offsets the address packet offset (APO) information that was used in previous ETM implementations. Rather than counting branches, TFOs count the number of bytes that are currently in the FIFO. Synchronizing in this manner removes the need for the TRACESYNC pin in the protocol. It also removes the need for starting tracing with a BE PIPESTAT followed by two dead cycles for APO values.

Whenever a TFO is broadcast for synchronization while trace is already enabled, a PIPESTAT value of IE is implied. When TFOs are broadcast to initiate tracing, no PIPESTAT is implied and PIPESTAT for the first traced instruction will be given in the following cycle.

TFOs for synchronization are generated whenever all the following criteria are met:
A cycle counter, typically initialized to 1024, reaches zero
The current instruction has a PIPESTAT value of 'IE'

Once a TFO has occurred, the TFO cycle counter is reset to whatever value has been programmed into the instruction synchronization register (default value is 1024). When a TFO cycle occurs, several bytes of data are placed on the FIFO that cycle. This data is referred to as a TFO packet and typically consists of a special header byte, the current CONTEXT ID, and a full instruction address. The proper format for TFO packets is given in section 5.4.

Note that, in the four-bit TRACEPKT configuration, if a TFO occurs when the second nibble of a byte is expected, an extra nibble of value '0x6' is output on TRACEPKT[3:0] immediately following the TFO value. This nibble is required since TFO values specify synchronization in terms of bytes, not nibbles. By outputting this extra nibble, ETM10 guarantees that current top of the FIFO, pointed to by the TFO value, will always be byte aligned. It is important that the decompressor is aware that this extra nibble will appear on TRACEPKT[3:0] for the case where synchronization is not required. The decompressor should always expect this extra nibble whenever a TFO is generated on an odd nibble regardless of whether the TFO is due to synchronization or Trace being enabled. FIFO output is delayed until the complete TFO value (and extra nibble, if required) has been output on TRACEPKT[3:0].

(y) Trigger Status

A trigger status (TR) implies that the real four-bit status for this cycle is placed on TRACEPKT[3:0] and FIFO output is delayed by one cycle. This behavior is identical to ETM7 and EMT9. If a trigger and a TFO want to occur at the same time, the PIPESTAT value on TRACEPKT[3:0] will be TD. This is uniquely identifiable as a true TFO since WT pipestats will never be converted to TD pipestats when a trigger occurs. In the four bit port case, if a trigger wants to occur in the second cycle of a TFO broadcast (or the gap cycle), the trigger will occur and the FIFO output will be delayed by an extra cycle to output the remaining TFO nibble(s). Therefore, triggers are never delayed and are guaranteed to be output immediately when generated.

(z) Packet Header Encodings

Packets are placed in the FIFO due to a PIPESTAT value with the 'D' encoding. Up to three packets (two data packets and one branch address packet) can be placed in the FIFO in a single cycle. Here are the encodings for packet header values:

| Value | Description |
|---|---|
| CXXXXXX1 | Branch address |
| CTTMSS00 | Load Miss data, TT = tag |
| C111TT10 | Load Miss occurred, TT = tag |
| C00MSS10 | Normal data |
| C01MSS10 | Auxiliary data |
| C10XXX10 | Reserved |
| C1100010 | Reserved |
| 01100110 | Ignore |
| 11100110 | Reserved |
| C1101010 | Value Not Traced |
| C1101110 | Implied |

The C bit on a data header is used to inform the decompression tool how many packets are being inserted into the FIFO in a single cycle. The C bit is asserted for each packet inserted up to but not including the last packet. This is necessary for the decompressor to know which packets should be tied to which cycle, and therefore which instruction. This C bit should not be confused with the address continue bit which is indicated by a lower case 'c'.

(aa) Branch Address

Branch addresses are encoded in a similar way to previous ETM implementations. A branch packet can still be one to five bytes long, and the decompression tool should expect more bytes whenever the c bit is enabled. However, bit zero of a branch address is no longer used to differentiate between Thumb and ARM state. Instead, all branch addresses are prefixed, pre-compression, with a one in $33^{rd}$ bit position. Once compressed, all branch addresses are suffixed with a one in the $0^{th}$ bit position. The one in bit zero identifies the packet as a branch address, and the one in bit 33 is used to help distinguish between ARM and thumb addresses. Since ARM addresses must be word aligned, only bits [31:2] of an ARM address are broadcast. Thumb addresses are half-word aligned and therefore need only broadcast bits [31:1]. Broadcasting a different number of bits for ARM and Thumb addresses combined with having the $33^{rd}$ bit always asserted pre-compression guarantees that a full five byte address will be broadcast on a transition between ARM and Thumb state. Furthermore, ARM and Thumb address can always be uniquely identified by the high order bits of the fifth address byte, as shown in the following table:

| ARM 5 byte address | Thumb 5 byte address |
|---|---|
| 1XXXXXX1 | 1XXXXXX1 |
| 1XXXXXXX | 1XXXXXXX |
| 1XXXXXXX | 1XXXXXXX |
| 1XXXXXXX | 1XXXXXXX |
| 00001XXX | 0001XXXX |

If present, a branch target address will always be the last item to be placed into the FIFO on a given cycle. Therefore, a packet continuation bit (C bit) is not required. Reasons codes are no longer broadcast on address bits 6:4 in the 5$^{th}$ byte since they are now given as part of the TFO packet header, which is discussed in section 5.4. Note that all encodings of the fifth address byte not given in the above table are reserved.

(bb) Normal Data

The normal data header is used for all loads that do not miss in the cache and for store data packets. It is also used for CPRT data packets if CPRT data tracing is enabled. If data address tracing is enabled, the data address will be broadcast after the header packet and before the data value, if present. Data addresses are broadcast using the same compression technique as instruction branch addresses and therefore consist of one to five bytes. As is true for previous ETM implementations, whether or not data addresses are traced must be statically determined before tracing begins. If two normal data packets are given in a single cycle (due to a 64 bit data transfer) only the first packet will contain a data address. When data for LSM instructions are broadcast, the data address is only broadcast with the first data packet, even though subsequent data packets will be transferred in different cycles.

The 'MSS' bits in the normal data encoding are used for data value compression. When the M bit is low, the SS bits specify the size of the data value transferred. Leading zeros are removed from the value as a simple form of data compression. Preliminary experiments show this compression technique yields about 20–30% compression, which is enough to offset the additional bandwidth cost of the header byte. Encodings with the M bit set are reserved for future compression techniques. The exact encodings for the MSS bits are given in the following table:

| Encoding | Description |
|---|---|
| 000 | Value = = 0, no data bytes follow |
| 001 | Value < 256, one data byte follows |
| 010 | Value < 65536, two data bytes follow |
| 011 | No compression done, four data bytes follow |
| 1xx | Reserved for future compression techniques |

(cc) Load Miss

Load requests that miss in the data cache are handled by the Load Miss Occurred and Load Miss Data header types. When a load miss occurs, a Load Miss Occurred packet is placed in the FIFO where the data value is expected. If data address tracing is enabled, the packet will include the data address. Otherwise, the packet will consist of just the Load Miss Occurred header byte. When a Load Miss Occurred packet is read, the decompression software will then know that the data value is now an outstanding miss, and it will be returned later. Once the data is returned, the PIPESTAT value for that cycle will be modified to the '+DATA' version and the Load Miss Data packet, consisting of the Load Miss Data header byte and the actual data value, will be placed in the FIFO. The Load Miss Data packet will never include a data address. Since the load/store unit must have a free cycle to return Load Miss data, this data will never be returned in the same cycle as data for another load or store request.

The 'TT' bits in the Load Miss header types are used as a tag to identify each load miss. The Load Miss Occurred packet will always have the same tag value as it's corresponding Load Miss Data packet. ARM1020E only supports one outstanding Load Miss at a time, but a second load miss packet may be broadcast before data for the first miss is returned. Therefore, to uniquely identify all load misses, tag values 2'b00 and 2'b01 are supported on ETM10 rev 0. Two bits have been allocated to the tag field to support future processors that may allow more outstanding misses. Furthermore, although ARM1020E will always return miss data in order (relative to other load misses), this tagging mechanism will support future processors that may return miss data out-of-order.

When a miss occurs on a 64 bit load value, two Load Miss packets are placed in the FIFO in the same cycle. The decompressor will know that these two misses are for a single 64 bit value since both packets will have the same tag value and they will be placed in the FIFO in the same cycle. As with normal data packets, the data address will only be present with the first Load Miss packet, and will not be present at all if the miss occurs in the middle of an LSM which has already broadcast data packets. When Load Miss data is returned for the 64 bit case, it is always returned as two separate Load Miss Data packets given in the same cycle. Both packets will have the same miss tag.

Load miss data packets use the MSS bits for size information and data compression as is done for normal data. If the decompressor receives an unexpected Load Miss data packet (i.e. a miss data packet is given without a pending miss occurred packet with the same tag), it should skip over the specified number of bytes given in the size. If trace is disabled before the outstanding miss data is returned then this data item will be placed in the FIFO with a 'DW' PIPESTAT as soon as it's available. If trace is enabled with a reason code of overflow or exited debug, the decompressor should cancel any pending Load Miss packets.

(dd) Auxiliary Data Tracing

The auxiliary data header encoding is a reserved slot set aside for expandability in the protocol. It is likely that this packet type will be used for tracing auxiliary data external to the processor core through the ETM on future revisions of ETM10. However, this feature, and this packet type, will not be used on ETM10 rev 0. Like other data packets, auxiliary data packets utilise the SS bits for size information, and support the M bit for future compression.

(ee) Ignore

When an ignore packet is received it is indicative of an empty FIFO. Ignore packets are not explicitly required for the protocol to work properly, but they may prove useful to aid future compression techniques. The ignore encoding will be implemented by simply outputting 0x6 on all unused nibbles of the TRACEPKT output. Assuming a 16-bit trace port, when there is only one byte of data output from the FIFO, the upper 8 bits will therefore be 0x66, which is the encoding of the ignore packet. Ignore packets output when cycle accurate tracing is enabled will result in a TRACEPKT [7:0] value of 0x67.

(ff) Implied

The implied packet can be used as an optimization when a loaded data value updates the PC. When this case occurs, the load data value will be replaced in the FIFO with the implied packet. When the decompressor receives an implied packet, it should recognize that the load data value is equivalent to the branch address value that has been traced. Implied packets are an optimization that may not be implemented. The decompressor should not expect that an implied packet will always be given when a load PC instruction is traced. This may optionally also be implemented when a store is made from the PC. The value stored can be determined by the decompressor from the current instruction address. The Implied packet is not likely to be implemented on ETM10 rev 0, but it is a possible optimization for future ETM implementations.

(gg) Value Not Traced

Previous ETM implementations have only been able to trace either all or none of the data values for an LSM operation, and this decision has been made at the time of the first transfer. Since today's compilers will often combine adjacent LDR/STR operations into an LSM unbeknownst to the user, this behaviour is undesirable. With the addition of Value Not Traced packets, we have added the ability to partially trace an LSM and only output the data values that exactly match the trigger criteria.

Whenever the first data value associated with an LSM is traced, a normal data packet is placed in the FIFO containing the data address (if address tracing is enabled) and the data value (if data value tracing is enabled). All subsequent data transfers for this LSM will result in a packet being placed in the FIFO. If subsequent values are traced, then a normal data packet, giving the data value only, will be traced. If subsequent data transfers should not be traced, then Value Not Traced packets will be placed on the FIFO for these transfers. Value Not Traced packets consist of only the Value Not Traced header byte. The decompression software can then use the Value Not Traced packets in combination with the normal data packets to determine which LSM values were traced and which were not by working backwards from the final data transfer. Note that, as stated earlier, once tracing begins on a LSM instruction, it will continue until the LSM completes, even if TraceEnable is deasserted before the instruction completes.

(hh) Reserved

There are a total of nine reserved slots remaining in the data header encodings. All of these slots are made available for enhancements to the protocol as required and/or for use by future ETM implementations. The M bit in the Normal Data, Load Miss Data, and Auxiliary Data encodings could also be used for new data header encodings instead of compression if even more header types are required by future ETM implementations.

(ii) TFO Packet Header Encodings

TFO packets are placed in the FIFO by a TFO cycle (described in Section 5.2.4). Since the decompressor will know when a packet is placed in the FIFO by a TFO, TFO packets have their own header byte encodings, which are completely independent from the encoding space used by PIPESTAT data packets. Here are the TFO packet header encodings:

| Value | Description |
|---|---|
| XXXXXX00 | ARM Instruction address |
| XXXXXXX1 | Thumb Instruction address |
| 0RR00010 | Normal TFO packet |
| 1RR00010 | LSM in progress TFO packet |
| XXXXX110 | Reserved |
| XXXX1010 | Reserved |
| XXX10010 | Reserved |

(jj) Instruction Address

If TRACEPKT[1:0]!=2'b10 for the first byte of a TFO packet, then this TFO packet consists of just an instruction address. Since a full address is always required, no compression is attempted and the address is always output as a four-byte value. Bit 0 of the address specifies whether it is a Thumb or an ARM instruction address. When a TFO packet consist of just the instruction address, this implies:

CONTEXT ID values are not traced (determined by ContextIDSize, ETM Control register bits [15:14])

The TFO reason code is 2'b00, normal synchronization

If the reason code is non-zero or a CONTEXT ID value is being traced, then one of the following TFO packets is required. TFO packets consisting of just an address are not strictly required for protocol compliance and will not be implemented on ETM10 rev 0.

(kk) Normal TFO Packet

Normal TFO packets consist of a header byte followed by 0 to 4 bytes of CONTEXT ID, followed by a 4-byte instruction address. The number of CONTEXT ID bytes traced is statically determined by ETM Control register bits [15:14]. The instruction address is always four bytes and is not compressed. Bit 0 specifies the Thumb bit. The TFO header byte contains the two-bit reason code (labeled as RR in the table above). These reason codes are consistent with the ones used by ETM7 and ETM9 in protocol versions 0 and 1. The reason codes are given in the following table:

| Value | Description |
|---|---|
| 00 | Normal synchronization |
| 01 | Tracing has been enabled |
| 10 | Trace restarted after overflow |
| 11 | ARM has exited from debug state |

(ll) LSM in Progress TFO Packet

LSM in Pogress packets occur only when trace is enabled in the middle of a multiple memory access instruction (LDM, STM, LDC, or STC), and another instruction is currently executing. These packets consist of a header byte followed by 0 to 4 bytes of CONTEXT ID, followed by a 4 byte instruction address for the LSM, followed by 1 to 5 bytes of compressed address for the instruction currently executing. The LSM instruction is a fixed four-byte address with bit 0 specifying the Thumb bit. The current instruction address is compressed using the same technique as branch addresses (as specified in section 5.3.1) The final instruction address is compressed relative to the full address from the LSM instruction. The next instruction PIPESTAT will be for the instruction pointed to by the second address and tracing begins in the normal way from this point forwards. This packet type is necessary for properly tracing all instructions that touch a particular data address or data value. Without it, the LSM instruction could not be properly traced based on the data address. Note that instructions occurring underneath the LSM are traced, even if tracing was programmed to turn on only during the LSM itself. Similarly, if tracing is turned on due to the instruction address of an instruction that just happens to execute underneath an LSM, a LSM in Progress TFO packet will still be output.

For further clarity of the differences between the Normal TFO packet and the LSM in Progress TFO packet, the following table expresses the bytes that should be expected for each case:

| Normal TFO Packet | | LSM in Progress TFO Packet | |
|---|---|---|---|
| Normal Header | (1 byte) | LSM in Progress header | (1 byte) |
| Context ID | (0–4 bytes) | Context I | (0–4 bytes) |
| Instruction Address | (4 bytes) | LSM Address | (4 bytes) |
| N/A | | Instruction Address | (0–5 bytes) |

ARM10 TRACE Interface

This section describes the signal interface between ARM1020E and ETM10. The majority of the interface is driven by ARM1020E into ETM10. Signal descriptions are divided into custom datapath inputs, synthesised control inputs, and ETM outputs. Synthesised control signals can be changed later, but datapath signal changes require custom logic rework and, therefore, these cannot be changed late in the design. All input signals are registered immediately inside ETM10 and all outputs are driven directly from the output of a register.

The interface consists of a total of 215 signals, which includes 213 inputs and 4 outputs from an ETM10 perspective.

(mm) ETM Datapath Inputs

There are four data buses of interest for ETM data tracing: load data, store data, MCR data, and MRC data. All four of these buses are 64 bits in width. Since it is only possible for one of these buses to contain valid data in any given cycle, all four buses are muxed down within ARM1020E to one 64 bit data bus, ETMDATA. ETMDATA is registered within ARM1020E before it is driven to the ETM. ETMDATA is valid in the write (WR) stage of the ARM1020E pipeline. There are four address buses driven from ARM1020E to ETM10. Three of these buses are for instruction addresses and one is for data addresses. The R15 buses are driven to ETM in the execute (EX) stage of the ARM1020E pipeline while the IA and DA address buses are valid in the memory (ME) stage. All datapath buses driven to ETM are given in the following table.

| Signal name | Description |
|---|---|
| ETMDATA[63:0] | Contains the data value for a Load, Store, MRC, or MCR instruction |
| DA[31:0] | Data address bus. Gives the address for every load or store transaction |
| IA[31:1] | Instruction address bus. Gives the address for every instruction fetch. |
| R15BP[31:1] | Address for the branch phantom currently in execute |
| R15EX[31:1] | Address for the instruction currently in execute |

(nn) ETM Control Inputs
  (oo) ETMCORECTL[20:0]
  ETMCORECTL includes a wide variety of control signals that all come from the ARM10 core. These signals are all registered within the core and combined onto this common bus before they are driven to ETM10. The control signals present on this bus and their meaning is given in the following table. Note that some changes to the signals present on this bus are expected as the implementation of ETM10 progresses. All of these are valid in the write stage (WR) of the ARM1020E pipeline, unless specified otherwise.

| Signal name | Description |
|---|---|
| BranchAddrValid | Indicates that the current address on the IA bus is a target for an indirect branch |
| ITBit | Thumb Bit for current instruction fetch (valid with IA) |
| InMREQ | Indicates that the current address on the IA bus is for a valid instruction fetch (valid in ME) |
| UpdatesCONTEXTID | Indicates that the current instruction is updating the CONTEXT ID. |
| R15HoldMe | Stall signal for the address given on R15EX. |
| BpValidEx | When asserted, a branch phantom is present in execute (qualified by LinkOnly) |
| BpCCFail | Branch phantom failed it's condition codes: (Taken XNOR Mispredict) |
| InstValid | Asserted once per executed instruction. Takes into account mispredicted branches |
| CCFailEx | Indicates that the instruction in execute failed it's condition codes |
| ETMBranch | Indicates that the instruction just executed is an indirect branch (by the ETM definition) |
| TbitEx | Asserted when ARM1020E is in thumb state |
| DnMREQ | Qualifies the Data Address bus, DA |
| DMAS[1:0] | Load or store data size (00==byte, 01 == half word, 10 = word) |
| ETMSwap | Indicates a 64 bit store to a big endian memory device. |
| DnRW | Determines whether the data request is a read operation or a write operation (0==read) |
| HUMACK | Specifies that valid load miss data is present on the data bus this cycle |
| LSCMInit | Indicates the first access on a LSM instruction (qualified by DnMREQ) |
| LSCM | Indicates a LSM is in progress in the Load/Store Unit (accesses qualified by DnMREQ) |
| MISSCNT[1:0] | Indicates how many load misses are outstanding. Transitions indicate a new miss. |

(pp) ETMDABORT
  ETMDABORT is simply a delayed version of the normal DABORT signal. It indicates that a data abort occurred for the current access. ETMDABORT is not integrated into the ETMCORECTL bus since it isdriven from the Data Cache, not the ARM10 core. ETMDABORT is qualified by DnMREQ.

(qq) ETMDATAVALID[1:0]
  This signal qualifies the data driven on the bus ETMDATA[63:0]. There is one bit for each half of the data bus.

(rr) ETM Outputs
  This section describes the outputs that feed back into ARM1020E and what is required from ARM1020E
    (ss) FIFOFULL
    The ETM output FIFOFULL is asserted whenever there are only a specified number of bytes remaining in the FIFO (the number of bytes remaining to assert FIFOFULL is user programmable). This functionality is identical to that used by previous ETM implementations. FIFOFULL can be taken by the core, in this case ARM1020E, and used to stall the ARM pipeline. This prevents ETM overflow, thus guarantees a complete trace with the side effect of changing slightly the timing of events happening in the core. Note that due to timing considerations, the assertion of FIFOFULL will not result in the immediate stalling of ARM1020E. It is up to the user to program FIFOFULL to assert early enough to prevent overflow from occurring. In a small ETM configuration, there are certain situations where preventing overflow from occurring may not be possible.

(tt) PWRDOWN

When HIGH this indicates that the ETM is not currently enabled, so the CLK input can be stopped. This is used to reduce power consumption when trace is not being used. At reset PWRDOWN will be asserted until the ETM10 has been programmed. The ARM10200 testchip should use the PWRDOWN output directly to gate the ETM10 CLK input. As previously noted, PWRDOWN will be temporarily disabled on a CONTEXT ID update to allow for an update on ETM10's internal CONTEXT ID shadow register. Except for the CONTEXT ID update case, PWRDOWN is changed synchronously to TCLK and will be cleared by the ARM debug tools at the start of a debug session. Since PWRDOWN changes many cycles before trace is enabled, using a TCLK based signal to gate the ETM10 CLK does not cause any metastablilty problems.

(uu) DBGRQ

Like previous ETM implementations, ETM10 can be programmed to assert DBGRQ whenever the trigger condition occurs. DGBRQ will remain asserted until DGBACK is observed. DBGRQ should be connected to the ARM1020E external debug request pin, EDBGRQ. No extra support from ARM1020E is required for this ETM output. If the EDBGRQ input is already in use by some other functional block in the ASIC, the multiple DGBRQ signals can be ORed together. Note that enabling debug in this manner is not guaranteed to fall on any particular instruction boundary. Furthermore, the core only recognizes EDGBRQ if ARM10 is currently in hardware debug mode.

(vv) TDO

ETM10 uses the same TAP interface wiring as previous ETM versions. The TDO pin is connected to the ARM1020E scan expansion input SDOUTBS. ETM10 registers are accessed via scan chain 6 and are programmed in a manner identical to previous ETM implementations. No extra support from ARM1020E is required for this ETM output.

Configurations

ETM7/9 have been made available in small, medium, and large configurations. Medium and large configurations offer more trigger hardware resources and increased FIFO depth at the cost of additional area. Different configurations can be chosen for different ASIC applications by simply resynthesising the soft macro with the new configuration. ETM10 will offer a similar range of configurations. The following table presents the configurations currently proposed for ETM10. Most trigger resources are identical to ETM7 and ETM9 with the exception of data comparators in the large configuration which was decreased from 8 to 4 due to the larger size of the 64 bit comparators. Increased FIFO sizes in each configuration reflect the need to support the higher instruction throughput (i.e. performance) of ARM1020E. FIFO sizes for each configuration may increase based on area impact and feedback from performance modelling. The gate counts given for ETM10 configurations are estimates based on the initial synthesis of the ETM10 rtl model. These estimated gate counts are likely to be different than what is achieved in the final implementation. A large size ETM10 is what will be placed on the ARM10200 testchip. The corresponding number of resources for ETM9 in each category is given in parentheses for comparison.

| Resource type | Small ETM10 (ETM9) | Medium ETM10 (ETM9) | Large ETM10 (ETM9) |
|---|---|---|---|
| Pairs of address comparators | 1 (1) | 4 (4) | 8 (8) |
| Data comparators | 0 (0) | 2 (2) | 4 (8) |
| Memory map decoders | 0 (4) | 0 (8) | 0 (16) |
| CONTEXT ID comparators | 0 (0) | 1 (0) | 3 (0) |
| Sequencers | 0 (0) | 1 (1) | 1 (1) |
| Counters | 1 (1) | 2 (2) | 4 (4) |
| External inputs | 2 (2) | 4 (4) | 4 (4) |
| External outputs | 0 (0) | 1 (1) | 4 (4) |
| FIFO depth | 15 (9) | 30 (18) | 60 (45) |
| Trace packet width | 4/8/16 (4/8) | 4/8/16 (4/8/16) | 4/8/16 (4/8/16) |
| Approximate Gate count | 35k (25k) | 50k (35k) | 75k (60k) |
| Approximate Area (0.25 process) | 1.8 mm$^2$ (1.1 mm$^2$) | 2.3 mm$^2$ (1.58 mm$^2$) | 4.7 mm$^2$ (3.1 mm$^2$) |
| Approximate Area (0.18 process) | 1.0 mm$^2$ (0.62 mm$^2$) | 1.26 mm$^2$ (0.9 mm$^2$) | 2.5 mm$^2$ (1.7 mm$^2$) |

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   (i) a register bank having a plurality of registers and operable to store data words to be processed:
   (ii) processing logic operable in response to a multi-word data transfer instruction to transfer a plurality of data words between respective registers within said register bank and respective storage locations within a data memory; and
   (iii) tracing logic triggered by detection of a predetermined trace initiating condition to commence tracing operation generating a trace data stream of trace data part way through said multi-word data transfer instruction whereby a subset of transfers of said plurality of data words are traced within said trace data stream, wherein all transfers of said multi-word data transfer instruction subsequent to said detection of said predetermined trace initiating condition are traced within said trace data stream, wherein said predetermined trace initiating condition is triggered from a triggering transfer with subsequent transfers giving rise to trace data even though they do not meet said predetermined trace initiating condition, wherein said triggering transfer gives rise to transfer trace data within said trace data stream and said subsequent transfers give rise to place holder trace data within said trace data stream, said place holder trace data being more compact and giving less information regarding a transfer than said transfer trace data.

2. Apparatus as claimed in claim 1, wherein said trace initiating condition is one or more of:

(i) a data word transfer using a predetermined register within said register bank;
(ii) a data word transfer using a predetermined memory address within a memory; and
(iii) a data word transfer of a data word having a predetermined value.

3. Apparatus as claimed in claim 1, wherein transfers of data words performed simultaneously by said processing logic and that are to be traced are written sequentially within said trace data stream by said tracing logic.

4. Apparatus as claimed in claim 3, wherein said multi-word data transfer instruction specifies a transfer order and said tracing logic writes said transfers that are to be traced in accordance with said transfer order.

5. Apparatus as for processing data, said apparatus comprising:
(i) a register bank having a plurality of registers and operable to store data words to be processed;
(ii) processing logic operable in response to a multi-word data transfer instruction to transfer a plurality of data words between respective registers within said register bank and respective storage locations within a data memory; and
(iii) tracing logic triggered by detection of a predetermined trace initiating condition to commence tracing operation generating a trace data stream of trace data part way through said multi-word data transfer instruction whereby a subset of transfers of said plurality of data words are traced within said trace data stream, wherein all transfers of said multi-word data transfer instruction subsequent to said detection of said predetermined trace initiating condition are traced within said trace data stream, wherein said predetermined trace initiating condition is triggered from a triggering transfer with subsequent transfers giving rise to trace data even though they do not meet said predetermined trace initiating condition, wherein said triggering transfer gives rise to transfer trace data within said trace data stream with at least one subsequent transfer giving rise to trace data even though it does not meet said predetermined trace initiating condition and at least one subsequent transfer giving rise to place holder trace data within said trace data stream, said place holder trace data being more compact and giving less information regarding a transfer than said transfer trace data.

6. Apparatus as claimed in claim 5, wherein said trace initiating condition is one or more of:
(i) a data word transfer using a predetermined register within said register bank;
(ii) a data word transfer using a predetermined memory address within a memory; and
(iii) a data word transfer of a data word having a predetermined value.

7. Apparatus as claimed in claim 5, wherein transfers of data words performed simultaneously by said processing logic and that are to be traced are written sequentially within said trace data stream by said tracing logic.

8. Apparatus as claimed in claim 7, wherein said multi-word data transfer instruction specifies a transfer order and said tracing logic writes said transfers that are to be traced in accordance with said transfer order.

9. A method of processing data, said method comprising the steps of:
(i) storing data words to be processed within a register bank having a plurality of registers;
(ii) in response to a multi-word data transfer instruction, transferring a plurality of data words between respective registers within said register bank and respective storage locations within a data memory; and
(iii) when triggered by detection of a predetermined trace initiating condition, commencing tracing operation generating a trace data stream of trace data part way through said multi-word data transfer instruction whereby a subset of transfers of said plurality of data words are traced within said trace data stream, wherein all transfers of said multi-word data transfer instruction subsequent to said detection of said predetermined trace initiating condition are traced within said trace data stream, said predetermined trace initiating condition is triggered from a triggering transfer with subsequent transfers giving rise to trace data even though they do not meet said predetermined trace initiating condition, and said triggering transfer gives rise to transfer trace data within said trace data stream and said subsequent transfers give rise to place holder trace data within said trace data stream, said place holder trace data being more compact and giving less information regarding a transfer than said transfer trace data.

10. A computer program product comprising a computer readable medium containing computer readable instructions for controlling a computer to analyse a trace data stream generated in accordance with the method of claim 9.

11. A method of processing data, said method comprising the steps of:
(i) storing data words to be processed within a register bank having a plurality of registers;
(ii) in response to a multi-word data transfer instruction, transferring a plurality of data words between respective registers within said register bank and respective storage locations within a data memory; and
(iii) when triggered by detection of a predetermined trace initiating condition, commencing tracing operation generating a trace data stream of trace data part way through said multi-word data transfer instruction whereby a subset of transfers of said plurality of data words are traced within said trace data stream, wherein all transfers of said multi-word data transfer instruction subsequent to said detection of said predetermined trace initiating condition are traced within said trace data stream, said predetermined trace initiating condition is triggered from a triggering transfer with subsequent transfers giving rise to trace data even though they do not meet said predetermined trace initiating condition, and said triggering transfer gives rise to transfer trace data within said trace data stream with at least one subsequent transfer giving rise to trace data even though it does not meet said predetermined trace initiating condition and at least one subsequent transfer giving rise to place holder trace data within said trace data stream, said place holder trace data being more compact and giving less information regarding a transfer than said transfer trace data.

12. A computer program product comprising a computer readable medium containing computer readable instructions for controlling a computer to analyse a trace data stream generated in accordance with the method of claim 11.

* * * * *